US011873724B2

(12) United States Patent
Kirklin et al.

(10) Patent No.: US 11,873,724 B2
(45) Date of Patent: Jan. 16, 2024

(54) COMPRESSOR ASSEMBLY WITH NONSTICK COATING AND METHOD OF MANUFACTURING SAME

(71) Applicant: GM GLOBAL TECHNOLOGY OPERATIONS LLC, Detroit, MI (US)

(72) Inventors: Jeremy R. Kirklin, Novi, MI (US); Carnell E. Williams, Ortonville, MI (US); Anil K. Sachdev, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 636 days.

(21) Appl. No.: 16/943,070

(22) Filed: Jul. 30, 2020

(65) Prior Publication Data

US 2022/0034235 A1 Feb. 3, 2022

(51) Int. Cl.

| | |
|---|---|
| ***F01D 25/00*** | (2006.01) |
| ***C22F 1/047*** | (2006.01) |
| ***C22F 1/053*** | (2006.01) |
| ***C22F 1/057*** | (2006.01) |
| ***C22C 21/08*** | (2006.01) |
| ***C22C 21/16*** | (2006.01) |
| ***C22C 21/10*** | (2006.01) |
| ***F02B 39/00*** | (2006.01) |
| ***F01D 5/28*** | (2006.01) |
| ***B05D 5/08*** | (2006.01) |

(52) U.S. Cl.

CPC ........... *F01D 25/007* (2013.01); *B05D 5/083* (2013.01); *C22C 21/08* (2013.01); *C22C 21/10* (2013.01); *C22C 21/16* (2013.01); *C22F 1/047* (2013.01); *C22F 1/053* (2013.01); *C22F 1/057* (2013.01); *F01D 5/288* (2013.01); *F01D 25/005* (2013.01); *F02B 39/00* (2013.01); *F05D 2220/40* (2013.01); *F05D 2230/90* (2013.01); *F05D 2240/24* (2013.01); *F05D 2300/173* (2013.01); *F05D 2300/43* (2013.01); *F05D 2300/432* (2013.01)

(58) Field of Classification Search

None

See application file for complete search history.

(56) References Cited

U.S. PATENT DOCUMENTS

| | | | | |
|---|---|---|---|---|
| 5,785,493 A * | 7/1998 | Ojima | .................. | F04D 29/162 415/173.1 |
| 8,292,589 B2 * | 10/2012 | Koga | .................. | B22D 21/007 416/223 R |
| 2020/0158131 A1 * | 5/2020 | Kessler | ................. | F04C 23/006 |

* cited by examiner

*Primary Examiner* — Daniel J. Schleis

(74) *Attorney, Agent, or Firm* — Harness, Dickey & Pierce, P.L.C.

(57) ABSTRACT

A compressor assembly may include a compressor housing and a compressor impeller disposed within the compressor housing. The compressor housing may have an internal aerodynamic surface that defines a circumferentially extending volute, and the compressor impeller may have an external aerodynamic surface that faces toward at least a portion of the internal aerodynamic surface of the compressor housing. A nonstick coating may be formed on the internal aerodynamic surface of the compressor housing or on the external aerodynamic surface of the compressor impeller. The nonstick coating may prevent foreign material introduced into the compressor assembly from collecting on the internal aerodynamic surface of the compressor housing or on the external aerodynamic surface of the compressor impeller.

20 Claims, 2 Drawing Sheets

COMPRESSOR ASSEMBLY WITH NONSTICK COATING AND METHOD OF MANUFACTURING SAME

INTRODUCTION

The present invention relates to internal combustion engines and, more particularly, to forced induction internal combustion engines.

Internal combustion engines operate by burning a mixture of air and fuel in combustion chambers defined by their cylinders. During combustion, the air/fuel mixture expands and applies direct force to reciprocating pistons contained within the cylinders, and the reciprocal motion of the pistons is converted into rotational motion by a crankshaft. Air is drawn into the cylinders of an internal combustion engine via an air intake manifold and exhaust gases produced from combustion of the air/fuel mixture are expelled from the cylinders of the engine into an exhaust gas manifold. The power and efficiency of such engines can be increased by using a gas compressor to increase the pressure and density of the air that is supplied to the cylinders of the engine prior to combustion. Engines that employ gas compressors in their air induction systems for this purpose may be referred to as forced induction engines. Gas compressors employed in the air induction systems of forced induction engines may be classified either as superchargers, which are powered by rotation of the engine's crankshaft, or turbochargers, which are powered by the flow of exhaust gases leaving the engine.

Air introduced into the cylinders of an internal combustion engine is typically drawn from the ambient environment, and thus may contain moisture, dust, dirt, debris, and other foreign material that can build-up within the air induction system of the engine, including on the internal components of the gas compressor. In addition, in engines that include positive crankcase ventilation (PCV) systems, blow-by gases introduced into the crankcase of the engine from the cylinders may be recirculated back into the cylinders, for example, by directing such gases from the crankcase into the air induction system of the engine. The blow-by gases introduced into the air induction system from the crankcase may comprise a mixture of air, water, oil, and fuel vapors, which also may contribute to the build-up of foreign material on the internal components of the air induction system. Such build-up can result in premature wear and may reduce the capacity of the gas compressor. To prevent such foreign material from entering the air induction system, a screen and an air filter are oftentimes located at the air intake portion of the air induction system, upstream of the gas compressor. However, such filtration devices are typically unable to remove all foreign materials from the ambient air and such material may build-up within the air induction system of the engine over time. Cleaning and removal of built-up foreign material on the internal components of the gas compressor typically requires disassembly of the compressor and manual removal of the built-up material, which can be labor intensive and costly.

SUMMARY

A compressor assembly may be configured to pressurize an airflow received from an ambient environment for delivery to an internal combustion engine having one or more cylinders. The compressor assembly may comprise a compressor housing and a compressor impeller disposed within the compressor housing. The compressor housing may have an internal aerodynamic surface that defines a circumferentially extending volute. The compressor impeller may have an external aerodynamic surface that faces toward at least a portion of the internal aerodynamic surface of the compressor housing. A nonstick coating may be formed on the internal aerodynamic surface of the compressor housing or on the external aerodynamic surface of the compressor impeller. The nonstick coating may comprise a polymeric material, a ceramic material, or a combination thereof.

In some embodiments, the nonstick coating may comprise a fluoropolymer, a polysiloxane, or a combination thereof. In embodiments where the nonstick coating comprises a fluoropolymer, the nonstick coating may comprise polytetrafluoroethylene, polyvinylidene fluoride, a perfluoroalkoxy polymer, fluorinated ethylene-propylene, or polyethylenetetrafluoroethylene.

The nonstick coating may have a thickness in a range of 15 μm to 100 μm.

At least one of the compressor housing or the compressor impeller may be made of an aluminum-based material. The aluminum-based material may comprise an aluminum alloy that includes at least one alloying element selected from the group consisting of silicon (Si), copper (Cu), chromium (Cr), magnesium (Mg), manganese (Mn), zirconium (Zr), or zinc (Zn).

The nonstick coating may prevent foreign material introduced into the compressor assembly along with the airflow from collecting on the internal aerodynamic surface of the compressor housing or on the external aerodynamic surface of the compressor impeller.

A method of manufacturing a component of a compressor assembly is provided. In such method, an aluminum alloy body having an aerodynamic surface may be provided. A precursor coating composition may be applied to at least a portion of the aerodynamic surface of the aluminum alloy body. Then, the precursor coating composition may be cured to form a nonstick coating on the aerodynamic surface of the aluminum alloy body. The nonstick coating may comprise a polymeric material, a ceramic material, or a combination thereof.

The nonstick coating may comprise a fluoropolymer, a polysiloxane, or a combination thereof.

The aluminum alloy body may be provided in the form of a compressor housing having an internal aerodynamic surface that defines a circumferentially extending volute. In such case, the nonstick coating may be formed on at least a portion of the internal aerodynamic surface of the compressor housing.

The aluminum alloy body may be provided in the form of a compressor impeller having an external aerodynamic surface. In such case, the nonstick coating may be formed on at least a portion of the external aerodynamic surface of the compressor impeller.

The precursor coating composition may be heat-curable. In such case, the precursor coating composition may be cured by heating the aluminum alloy body to a temperature and for a duration sufficient to cure the precursor coating composition and form the nonstick coating on the aerodynamic surface of the aluminum alloy body.

The aluminum alloy body may comprise a heat-treatable aluminum alloy that includes an alloy of aluminum and at least one alloying element. In such case, the at least one alloying element may be selected from the group consisting of silicon (Si), copper (Cu), chromium (Cr), magnesium (Mg), manganese (Mn), zirconium (Zr), or zinc (Zn).

Prior to applying the precursor coating composition to at least a portion of the aerodynamic surface of the aluminum alloy body, the aluminum alloy body may be heated to a first temperature below a solidus temperature of the alloy for a duration sufficient to cause the at least one alloying element to enter into a homogenous solid solution with the aluminum.

After the precursor coating composition is applied to the aerodynamic surface of the aluminum alloy body, the aluminum alloy body may be heated to a second temperature below the first temperature for a duration sufficient to cause the at least one alloying element to precipitate from the solid solution and form a precipitate phase within an aluminum alloy matrix phase in the aluminum alloy body. In such case, heating the aluminum alloy body to the second temperature may cure the precursor coating composition and transform the precursor coating composition into the nonstick coating.

The precursor coating composition may be applied to at least a portion of the aerodynamic surface of the aluminum alloy body using a high-volume, low pressure spraying process, an electrostatic spraying process, a thermal evaporation process, or during an anodization process.

The precursor coating composition may be applied to at least a portion of the aerodynamic surface of the aluminum alloy body in the form of a solid powder or as an aqueous or non-aqueous liquid.

A method of manufacturing a component of a compressor assembly is provided. In such method, an aluminum alloy body having an aerodynamic surface may be provided. The aluminum alloy body may comprise an alloy of aluminum and at least one alloying element. The aluminum alloy body may be heated to a first temperature below a solidus temperature of the alloy for a duration sufficient to cause the at least one alloying element to enter into a homogenous solid solution with the aluminum. Then, the aluminum alloy body may be quenched to ambient temperature to hold the at least one alloying element in the form of a supersaturated solid solution with the aluminum. The supersaturated solid solution may include an aluminum matrix phase. A heat-curable precursor coating composition may be applied to at least a portion of the aerodynamic surface of the aluminum alloy body. Then, the aluminum alloy body may be heated to a second temperature below the first temperature for a duration sufficient to cause the at least one alloying element to precipitate from the aluminum alloy matrix phase and form a precipitate phase within the aluminum alloy matrix phase. Heating the aluminum alloy body to the second temperature may cure the heat-curable precursor coating composition and transform the heat-curable precursor coating composition into a nonstick coating on the aerodynamic surface of the aluminum alloy body. The first temperature may comprise a temperature in a range of 450° C. to 575° C., and the second temperature may comprise a temperature in a range of 75° C. to 350° C.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

Illustrative embodiments will hereinafter be described in conjunction with the appended drawings, wherein like designations denote like elements, and wherein.

Figure 1:
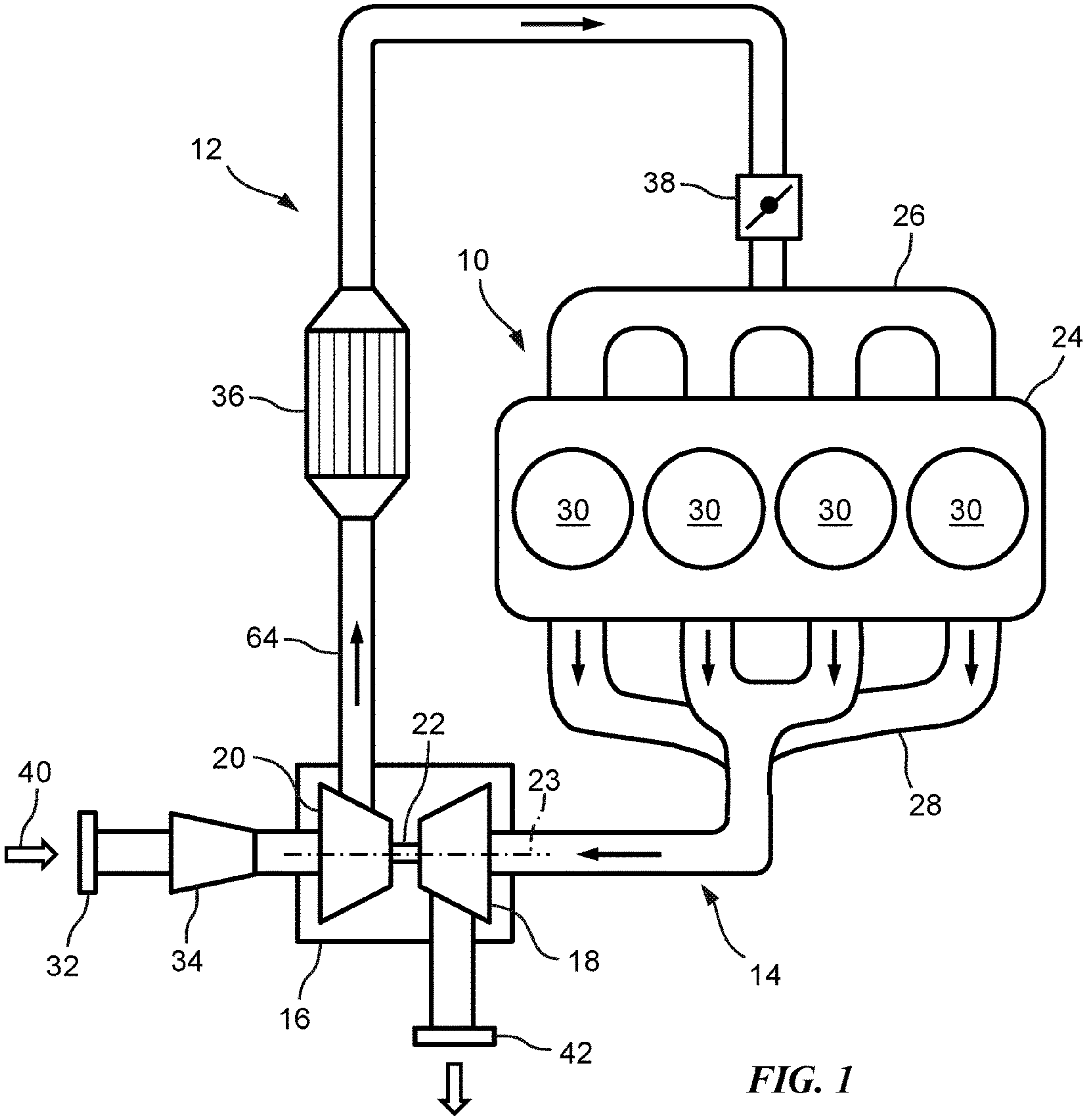
FIG. 1 is a schematic depiction of an internal combustion engine coupled to an air intake system, an exhaust gas system, wherein the air intake system and the exhaust gas system together define a turbocharger assembly.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

The presently disclosed compressor assembly includes a nonstick coating formed on one or more aerodynamic surfaces thereof. The nonstick coating helps prevent build-up of foreign materials on the aerodynamic surfaces of the compressor assembly, which may help prevent premature wear of the compressor assembly and also help maintain the desired volumetric flow rate, outlet air pressure, and efficiency of the compressor assembly.

In some embodiments, the nonstick coating may be formed on one or more aerodynamic surfaces of one or more components of the compressor assembly by applying a heat-curable precursor coating composition to the aerodynamic surfaces, and then heating the components to cure the precursor coating composition and form a final nonstick coating thereon. In other embodiments, the precursor coating composition applied to the aerodynamic surfaces may be cured at ambient temperature or by exposure to ultraviolet (UV) light.

In some embodiments, the nonstick coating may be formed on an aerodynamic surface of a component of the compressor assembly after manufacture of such component is complete, but prior to assembly of the compressor assembly. In other embodiments, a precursor coating composition may be applied to an aerodynamic surface of a component of the compressor assembly during an intermediate manufacturing stage. For example, a precursor coating composition may be applied to an aerodynamic surface of a component of the compressor assembly prior to subjecting the component to a heat treatment process. In such case, the heat applied to the component during the heat treatment process may be sufficient to effectively cure the precursor coating composition, thereby eliminating the need for a separate curing step.

FIG. 1 depicts an exemplary embodiment of an internal combustion engine 10 coupled to an air intake system 12 and an exhaust gas system 14. The air intake system 12 and the exhaust gas system 14 together define a turbocharger assembly 16 that includes a turbine assembly 18 and a compressor assembly 20 mechanically coupled to the turbine assembly 18 via a common shaft 22 that defines a central longitudinal axis 23.

The engine 10 may be a diesel or gasoline-powered internal combustion engine and/or may be a compression ignited or spark ignited internal combustion engine. The internal combustion engine 10 includes an engine block 24, an intake manifold 26, and an exhaust manifold 28. The engine block 24 defines a plurality of cylinders 30, with each cylinder 30 having a reciprocating piston (not shown) disposed therein. The engine 10 illustrated in FIG. 1 includes four (4) cylinders 30; however, in other embodiments, the engine 10 may include more than or less than this amount, e.g., one, two, six, eight, ten, and/or twelve cylinders 30.

Each cylinder 30 of the engine 10 is in fluid communication with the air intake system 12 via the intake manifold 26 and with the exhaust gas system 14 via the exhaust manifold 28. The intake manifold 26 of the engine 10 directs air from the air intake system 12 into the cylinders 30 of the engine 10, and the exhaust manifold 28 directs exhaust gas from the cylinders 30 of the engine 10 into the exhaust gas system 14. In operation, a mixture of air and fuel is introduced into a combustion chamber defined above a reciprocating piston disposed within each cylinder 30 of the engine 10. The mixture of air and fuel may be introduced into the combustion chamber, for example, via an intake valve (not shown). Ignition and combustion of the air/fuel mixture takes place within the combustion chamber of each cylinder 30, and exhaust gases are produced as by-products of the combustion reaction. Then, the exhaust gases are expelled from the cylinders 30 of the engine, for example, via an exhaust valve (not shown). Under some circumstances, a small amount of the air/fuel mixture introduced into the combustion chambers may escape past the reciprocating pistons and into a crankcase (not shown) of the engine during a phenomenon referred to as "blow-by." The blow-by gases introduced into the crankcase may comprise a mixture of air, water, and fuel vapors, which may degrade the engine oil within the crankcase, contribute to build-up within the crankcase, and also may undesirably increase the pressure within the crankcase. To help remove blow-by gases from the crankcase of the engine 10, a positive crankcase ventilation (PCV) system (not shown) may be used that recirculates blow-by gases introduced into the crankcase of the engine 10 back into the cylinders 30, for example, by directing such gases from the crankcase into the air intake system 12 of the engine 10. The recirculated gases from the crankcase may comprise a mixture of air, water, fuel vapors, and engine oil.

The air intake system 12 receives air from the ambient environment (and optionally from the crankcase) and supplies compressed air to the intake manifold 26 of the engine 10 at a desired temperature and pressure. The air intake system 12 may comprise an air intake 32, an air filter 34, the compressor assembly 20, an intercooler 36, and a throttle 38. Ambient air 40 is received from the ambient environment via the air intake 32 of the air intake system 12 and passed through the air filter 34, where solid and/or liquid contaminants of a predetermined size are removed therefrom. The filtered air, and optionally the mixed air and gases from the crankcase, are then inducted into the compressor assembly 20, where the air is compressed to a desired pressure greater than atmospheric pressure (i.e., greater than 1 atm, or greater than 1.01325 bar). The intercooler 36 is located downstream of the compressor assembly 20 in the air intake system 12 and helps cool the compressed air to a suitable temperature prior to introduction into the intake manifold 26 of the engine 10. The throttle 38 may control or regulate the amount of compressed air that is supplied to the intake manifold 26 and to the cylinders 30 of the engine.

The exhaust gas system 14 receives exhaust gases expelled from the cylinders 30 of the engine 10 via the exhaust manifold 28. At least some of the exhaust gases discharged from the engine 10 are directed toward into the turbine assembly 18 prior to being discharged to the ambient environment, for example, via an exhaust gas outlet 42.

Figure 2:
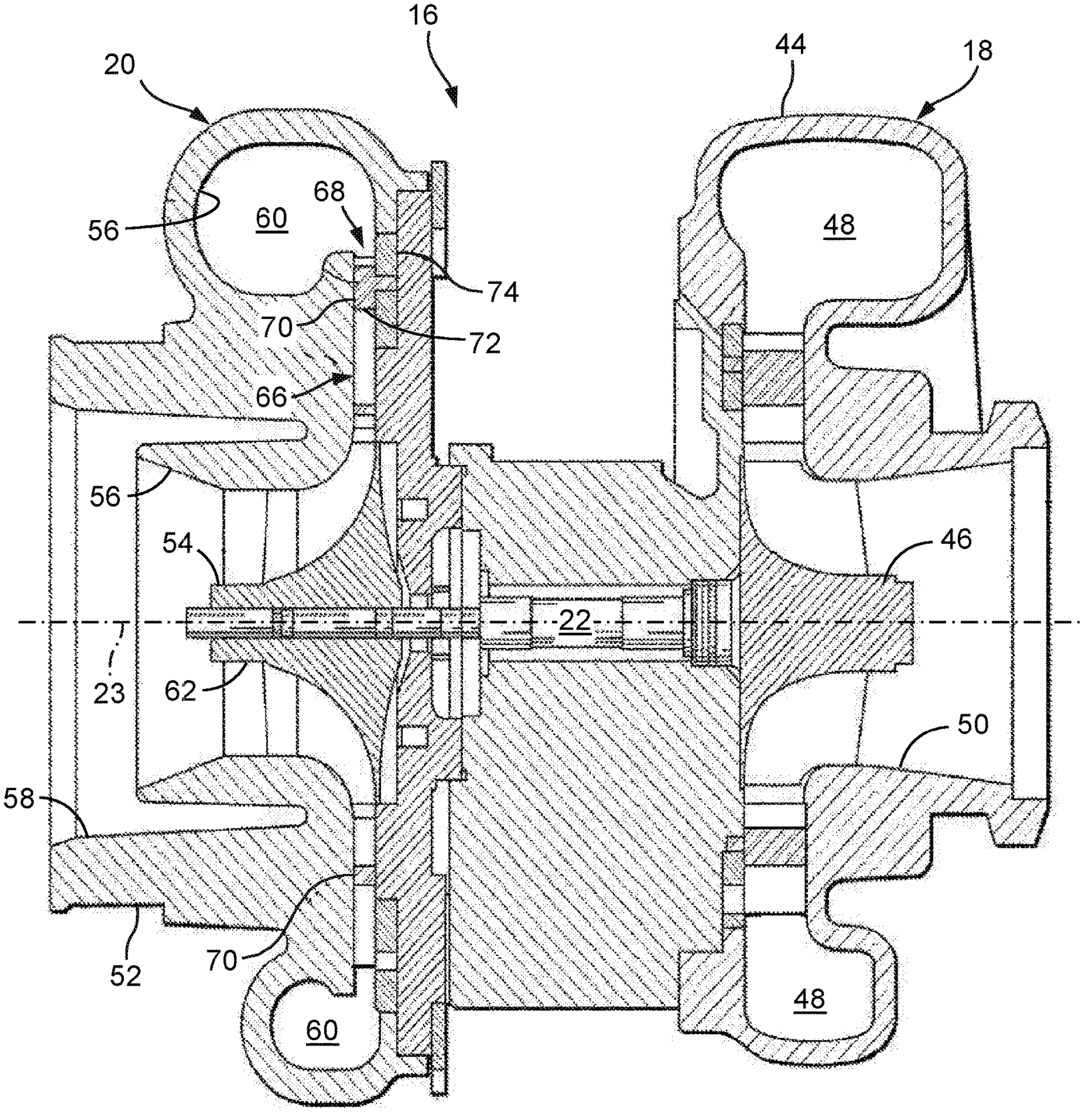
FIG. 2 is a schematic side cross-sectional view of the turbocharger assembly of FIG. 1.

Referring now to FIG. 2, the turbine assembly 18 includes a turbine housing 44 and a turbine wheel 46 rotatably disposed within the turbine housing 44. The turbine housing 44 defines an internal passageway 48 through which exhaust gases are received from the exhaust manifold 28 and directed toward and around the turbine wheel 46. Thereafter, the exhaust gases are expelled from the turbine housing 44 via an outlet 50. The turbine wheel 46 captures kinetic energy from the exhaust gases received within the passageway 48 of the turbine assembly 18, which causes the turbine wheel 46 to rotate. Because the turbine wheel 46 is mechanically coupled to the common shaft 22, rotation of the turbine wheel 46, in turn, causes the common shaft 22 of the turbocharger assembly 16 to rotate unitarily.

The compressor assembly 20 includes a compressor housing 52 and a compressor impeller 54 rotatably disposed within the compressor housing 52. The compressor housing 52 has an internal aerodynamic surface 56 that defines an air inlet 58 and a circumferentially extending volute 60 that surrounds a radially outer periphery of the compressor impeller 54. The compressor impeller 54 is configured to pressurize air received in the inlet 58 of the housing 52 and has an external aerodynamic surface 62 that faces toward at least a portion of the internal aerodynamic surface 56 of the compressor housing 52. Air is received in the inlet 58 of the compressor housing 52 and directed around the compressor impeller 54 and through the circumferentially extending volute 60. The compressor impeller 54 is mechanically coupled to the common shaft 22, and, as such, rotation of the common shaft 22 causes the compressor impeller 54 to rotate unitarily with the common shaft 22. Rotation of the compressor impeller 54 draws air into the compressor housing 52 in an axial direction, and directs the air to flow around the impeller 54, and through the volute 60, which pressurizes the air prior to its being discharged from the compressor assembly 20 in a radial direction into a downstream conduit 64 of the air intake system 12.

The compressor assembly 20 also may include a diffuser section 66 and a variable geometry mechanism 68. The diffuser section 66 may extend between the inlet 58 of the compressor housing 52 and volute 60, and may be at least partially defined by the internal aerodynamic surface 56 of the compressor housing 52. The diffuser section 66 may be operable to reduce the velocity of the air received within the compressor housing 52. The variable geometry mechanism 68 may be operable to vary the flow pattern of the air from the compressor impeller 54 to the volute 60. The variable geometry mechanism 68 of the compressor assembly 20 may include a plurality of radially arranged vanes 70 disposed about the compressor impeller 54. The vanes 70 may have external aerodynamic surfaces 72 and may be movable in unison through an actuation means such as a control ring 74.

The compressor assembly 20, including the compressor housing 52, compressor impeller 54, and the vanes 70 of the variable geometry mechanism 68, may be made of an aluminum-based material, a titanium-based material, and/or a magnesium-based material. The compressor housing 52, compressor impeller 54, and the vanes 70 may be made of the same or different materials.

The term "aluminum-based material," as used herein, refers to materials that comprise pure aluminum (Al) or an alloy of aluminum and at least one other metal or nonmetal (alloying element), e.g., silicon (Si), copper (Cu), chromium (Cr), magnesium (Mg), manganese (Mn), zirconium (Zr), and/or zinc (Zn). Aluminum alloys may comprise, by weight, 85% or more aluminum, preferably ≥90% aluminum, and more preferably ≥95% aluminum. Other metal or nonmetal elements unintentionally may be present, for example, as impurities, in aluminum-based materials in relatively small amounts, e.g., less than 5%, preferably less than 3%, and more preferably less than 0.2% by weight of the aluminum-based material. The term "titanium-based material," as used herein, refers to materials that comprise pure titanium (Ti), as well as alloys of titanium and one or more other metal or nonmetal alloying elements. Titanium alloys may comprise, by weight, 85% or more titanium, preferably ≥90% titanium, and more preferably ≥95% titanium. The term "magnesium-based material," as used herein, refers to materials that comprise pure magnesium (Mg), as well as alloys of magnesium and one or more other metal or nonmetal alloying elements. Magnesium alloys may comprise, by weight, 85% or more magnesium, preferably ≥90% magnesium, and more preferably ≥95% magnesium.

In embodiments where one or more of the components of the compressor assembly 20 are made of an aluminum-based material, the aluminum-based material used to form the one or more components of the compressor assembly 20 may comprise a heat-treatable aluminum alloy. A "heat-treatable aluminum alloy" refers to an aluminum alloy that can be strengthened by being subjected to a solution heat treatment followed by an artificial aging heat treatment.

Aluminum alloys that may be used for the compressor housing 52, compressor impeller 54, and/or the vanes 70 of the compressor assembly 20 include aluminum-silicon alloys, aluminum-silicon-magnesium alloys, aluminum-silicon-magnesium-copper alloys, aluminum-silicon-magnesium-copper-chromium alloys, aluminum-copper-magnesium-manganese alloys, and aluminum-zinc-magnesium-copper-chromium alloys. One specific aluminum-silicon-magnesium alloy that may be used for the compressor assembly 20 is aluminum alloy 356.0 or A356.0, which may comprise, by weight, 6.5-7.5% Si, 0.2-0.45% Mg, and Al as balance. One specific aluminum-silicon-magnesium-copper alloy that may be used for the compressor assembly 20 is aluminum alloy 332, which may comprise, by weight, 8.8-10.5% Si, 2.0-4.0% Cu, 0.5-1.5% Mg, and Al as balance. Aluminum alloys that comprise 4-13% silicon by weight of the aluminum alloy, and optionally one or more other alloying elements (i.e., metals or nonmetals), may beneficially be used in embodiments where the compressor assembly 20 is formed by casting. One specific aluminum-magnesium-silicon-copper-chromium alloy that may be used for the compressor assembly 20 is aluminum alloy 6061, which may comprise, by weight, 0.8-1.2% Mg, 0.4-0.8% Si, 0.15-1.4% Cu, 0.04-0.35% Cr, and Al as balance. One specific aluminum-copper-magnesium-manganese alloy that may be used for the compressor assembly 20 is aluminum alloy 2024, which may comprise, by weight, 3.7-4.5% Cu, 1.2-1.5% Mg, 0.15-0.8% Mn, and Al as balance. One specific aluminum-zinc-magnesium-copper-chromium alloy that may be used for the compressor assembly 20 is aluminum alloy 7075, which may comprise, by weight, 5.1-6.1% Zn, 2.1-2.9% Mg, 1.2-2.0% Cu, 0.18-0.28% Cr, and Al as balance.

A nonstick coating (not shown) is formed on at least a portion of at least one of the aerodynamic surfaces 56, 62, 72 of the compressor assembly 20. The aerodynamic surfaces 56, 62, 72 of the compressor assembly 20 are surfaces that are in contact with the ambient air flowing through the compressor assembly 20 during operation thereof. For example, the nonstick coating may be formed on at least a portion of the internal aerodynamic surface 56 of the compressor housing 52, on at least a portion of the external aerodynamic surface 62 of the compressor impeller 54, and/or on at least a portion of the external aerodynamic surfaces 72 of the vanes 70. The nonstick coating may comprise any material that helps prevent moisture, dust, dirt, debris, carbon-based materials, and other foreign materials from sticking to and/or being collected on the aerodynamic surfaces 56, 62, 72 of the compressor assembly 20. Such foreign materials may be introduced into the compressor assembly 20 along with the air from the surrounding ambient environment and/or from the PCV system. The nonstick coating may have a thickness in the range of 15 μm to 100 μm. For example, the nonstick coating may have a thickness of greater than 15 μm or 35 μm, less than 25 μm or 50 μm, or between 15 μm to 25 μm or between 35 μm to 50 μm.

In some embodiments, the nonstick coating may comprise a polymeric material, a ceramic material, or a combination thereof. Examples of polymeric materials that may be used for the nonstick coating include fluoropolymers, polysiloxanes, and combinations thereof. Examples of fluoropolymers that may be included in the nonstick coating include polytetrafluoroethylene (PTFE), polyvinylidene fluoride (PVDF), perfluoroalkoxy polymers (PFAs, e.g., copolymers of tetrafluoroethylene and perfluoroethers), fluorinated ethylene-propylene (FEP), and polyethylenetetrafluoroethylene (ETFE). Examples of perfluoroalkoxy polymers include copolymers of tetrafluoroethylene and perfluoropropylvinylether and copolymers of tetrafluoroethylene and hexafluoropropylene. As used herein, the term "ceramic" refers to an inorganic compound of a metal or metalloid and a nonmetal. Examples of ceramic materials that may be used for the nonstick coating include zirconia, silica, alumina, and titanium dioxide.

The components of the compressor assembly 20, including the compressor housing 52, compressor impeller 54, and the vanes 70, may be formed by casting (e.g., die casting, sand casting, or permanent mold casting) or wrought by hot or cold working (e.g., forging). In such case, an aluminum alloy body defining the shape of the compressor housing 52, compressor impeller 54, or the vanes 70 may be formed by a casting or forging process, which may be followed by a machining process.

Thereafter, the aluminum alloy body may be subjected to a heat treatment process, for example, to reduce chemical segregation within the aluminum alloy body, improve workability of the aluminum alloy body, soften a strain-hardened or heat-treated aluminum alloy body, relieve stresses, stabilize mechanical properties and physical dimensions, effect solid solution of alloying elements, and/or harden the aluminum alloy body by precipitating alloying elements from solid solution. One or more of the following heat treatment processes may be applied to the aluminum alloy body to achieve such results: homogenizing, annealing, solution heat treating, and/or precipitation hardening, which may involve a natural aging step or artificial aging step.

In some embodiments, the aluminum alloy body may be subjected to a homogenizing heat treatment step, for example, to reduce chemical segregation within the aluminum alloy body and/or to improve workability of the aluminum alloy body. In a homogenizing heat treatment step, the aluminum alloy body may be heated to a temperature in the range of 450° C. to 550° C., and then slowly cooled to ambient temperature. Additionally or alternatively, the aluminum alloy body may be subjected to an annealing heat treatment step, for example, to soften a strain-hardened or heat-treated aluminum alloy body, relieve stresses, stabilize mechanical properties and physical dimensions. In an annealing heat treatment step, the aluminum alloy body may be heated at a temperature in the range of 300-410° C. for a duration in the range of 0.5 hours to 3 hours, followed by cooling at a maximum rate of 20° C. per hour until the temperature of the aluminum alloy body is less than 290° C., after which the aluminum alloy body may be cooled at any desirable rate.

In some embodiments, the aluminum alloy body may be subjected to a solution heat treatment step, for example, to effect solid solution of alloying elements and/or to improve the mechanical properties of the alloy. In a solution heat treatment step, the aluminum alloy body may be heated to a target temperature based upon the composition of the aluminum alloy and held at such temperature for a duration sufficient to cause one or more of the alloying elements (e.g., Si, Cu, Cr, Mg, Mn, and/or Zn) or compounds thereof to dissolve and enter into a solid solution within the Al matrix. Then, the aluminum alloy body may be cooled rapidly enough to hold the dissolved alloying elements in a homogenous supersaturated solid solution within the Al matrix. The temperature at which the solution heat treatment step is performed may be a temperature below a solidus temperature of the aluminum alloy body, but above a solvus temperature of the one or more alloying elements or compounds (e.g., intermetallic phases) in the aluminum alloy body. For example, during the solution heat treatment step, the aluminum alloy body may be heated in air at a temperature in the range of 450° C. to 575° C. for a duration of 30 minutes to 12 hours. In one form, the solution heat treatment step may be performed at a temperature of 540° C. for a duration of 1-4 hours. After the solution heat treatment step, the aluminum alloy body may be quenched by being submerged in a fluid (e.g., water, a water-polymer solution, or air) having a temperature in the range of 65° C. to 100° C. The objective of quenching is to preserve the solid solution formed during the solution heat treatment step, by rapidly cooling the aluminum alloy body to some lower temperature, usually ambient temperature.

In some embodiments, the aluminum alloy body may be subjected to an artificial aging step, which may be performed after a solution heat treatment step and/or after the aluminum alloy body has been subjected to an elevated temperature shaping process. In the artificial aging step, the aluminum alloy body may be heated to a target temperature based upon the composition of the aluminum alloy and held at such temperature for a duration sufficient to cause one or more of the dissolved alloying elements (e.g., Si, Cu, Cr, Mg, Mn, and/or Zn) to precipitate from the supersaturated solid solution and form a precipitate phase within the Al matrix phase, which may improve the strength and/or hardness of the aluminum alloy body. The temperature at which the artificial aging step is performed may be a temperature below the solidus temperature of the aluminum alloy body and also below the solvus temperature of the precipitate phase. During the artificial aging step, the aluminum alloy body may be heated in air at a temperature in the range of 75° C. to 350° C. or in the range of 93° C. to 245° C. for a duration of 2 hours to 18 hours, and then cooled to ambient temperature. The specific temperatures and times at which the solution heat treatment step and the artificial aging step are performed will depend upon the specific composition of the aluminum alloy body.

In some embodiments, the nonstick coating may be formed on an aerodynamic surface of the aluminum alloy body by applying a heat-curable precursor coating composition to the aerodynamic surface of the aluminum alloy body, and then heating the aluminum alloy body and the precursor coating composition at a temperature and for a time sufficient to cure the precursor coating composition. In other embodiments, the precursor coating composition applied to the aerodynamic surfaces may be cured at ambient temperature or by exposure to ultraviolet (UV) light. Prior to applying the heat-curable precursor coating composition to the aerodynamic surface of the aluminum alloy body, the aerodynamic surface may be cleaned or degreased to remove surface impurities. In some embodiments, the aluminum alloy body optionally may be pre-heated or pre-baked at a temperature in the range of 180° C. to 425° C. to help remove oils and other carbon-based materials from the aerodynamic surface prior to applying the heat-curable precursor coating composition thereto. The aerodynamic surface of the aluminum alloy body also may be subjected to a surface roughening treatment (e.g., grit blasting) to improve adhesion of the nonstick coating thereto.

The precursor coating composition may be applied to the aerodynamic surface of the aluminum alloy body, for example, via a spraying process (e.g., a high-volume, low pressure or an electrostatic spraying process), a thermal evaporation process, or during an anodization process, for example, by incorporating the precursor coating composition in the anodizing bath. The precursor coating composition may be deposited onto the aerodynamic surface of the aluminum alloy body in the form of a solid powder or as an aqueous or non-aqueous liquid in the form of a suspension or an emulsion.

In embodiments where the precursor coating composition is heat-curable, the precursor coating composition may be applied to the aluminum alloy body prior to a homogenizing, annealing, solution heat treating, and/or artificial aging step. In such case, the heat applied to the aluminum alloy body during the subsequent heat treatment step may be sufficient to cure the precursor coating composition and form the final nonstick coating on the aerodynamic surface of the aluminum alloy body. In some embodiments, the aluminum alloy body may be heated to a temperature in the range of 180° C. to 425° C. for 1-4 hours during the subsequent heat treatment step to effectively and sufficiently cure the precursor coating composition. In one specific example, the precursor coating composition may be heat-curable and may be applied to the aluminum alloy body after a solution heat treatment step and quenching step, but prior to an artificial aging step. In such case, the heat applied to the aluminum alloy body during the subsequent artificial aging step may be sufficient to cure the precursor coating composition and form the final nonstick coating on the aerodynamic surface of the aluminum alloy body.

After formation of the nonstick coating on the aerodynamic surface of the aluminum alloy body, the aluminum alloy body may be subjected to one or more finishing steps to transform the aluminum alloy body into its final form as a compressor housing 52, compressor impeller 54, or vane 70.

Forming the nonstick coating on at least a portion of one or more of the aerodynamic surfaces 56, 62, 72 of the compressor assembly 20 may help prevent the build-up of foreign materials on the one or more aerodynamic surfaces 56, 62, 72. In addition, by applying the precursor coating composition to the aluminum alloy body prior to heat treating, the precursor coating composition may be cured by the heat applied to the aluminum alloy body during the heat treatment process, which may eliminate the need for an additional heat treatment step to cure the precursor coating composition. These and other benefits will be readily appreciated by those of ordinary skill in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A compressor assembly configured to pressurize an airflow for delivery to an internal combustion engine having one or more cylinders, the compressor assembly comprising:

a compressor housing having an internal aerodynamic surface that defines a circumferentially extending volute;

a compressor impeller disposed within the compressor housing and having an external aerodynamic surface that faces toward at least a portion of the internal aerodynamic surface of the compressor housing; and a nonstick coating formed on the internal aerodynamic surface of the compressor housing or on the external aerodynamic surface of the compressor impeller, wherein the nonstick coating comprises a polysiloxane, zirconia, silica, alumina, titanium dioxide, polyvinylidene fluoride, a perfluoroalkoxy polymer, fluorinated ethylene-propylene, or a combination thereof.

2. The assembly of claim 1 wherein the nonstick coating comprises polyvinylidene fluoride, a perfluoroalkoxy polymer, fluorinated ethylene-propylene, or a combination thereof.

3. The assembly of claim 1 wherein the nonstick coating has a thickness in a range of 15 μm to 100 μm.

4. The assembly of claim 1 wherein at least one of the compressor housing or the compressor impeller is made of an aluminum alloy comprising at least one alloying element selected from the group consisting of silicon (Si), copper (Cu), chromium (Cr), magnesium (Mg), manganese (Mn), zirconium (Zr), and zinc (Zn).

5. The assembly of claim 1 wherein at least one of the compressor housing or the compressor impeller is made of an aluminum alloy comprising at least one alloying element selected from the group consisting of chromium (Cr), manganese (Mn), zirconium (Zr), and zinc (Zn).

6. The assembly of claim 1 wherein the nonstick coating prevents foreign material introduced into the compressor assembly along with the airflow from collecting on the internal aerodynamic surface of the compressor housing or on the external aerodynamic surface of the compressor impeller.

7. The assembly of claim 1 wherein the nonstick coating comprises zirconia, silica, alumina, titanium dioxide, or a combination thereof.

8. The assembly of claim 1 wherein the nonstick coating comprises a copolymer of tetrafluoroethylene and perfluoropropylvinylether, a copolymer of tetrafluoroethylene and hexafluoropropylene, or a combination thereof.

9. The assembly of claim 1 wherein at least one of the compressor housing or the compressor impeller is made of an aluminum-silicon-magnesium-copper-chromium alloy, an aluminum-copper-magnesium-manganese alloy, or an aluminum-zinc-magnesium-copper-chromium alloy.

10. A method of manufacturing a component of a compressor assembly, the method comprising:

providing an aluminum alloy body having an aerodynamic surface;

applying a precursor coating composition to at least a portion of the aerodynamic surface of the aluminum alloy body; and then curing precursor coating composition to form a nonstick coating on the aerodynamic surface of the aluminum alloy body, wherein the nonstick coating comprises a polysiloxane, zirconia, silica, alumina, titanium dioxide, polyvinylidene fluoride, a perfluoroalkoxy polymer, fluorinated ethylene-propylene, or a combination thereof.

11. The method of claim 10 wherein the aluminum alloy body is provided in the form of a compressor housing having an internal aerodynamic surface that defines a circumferentially extending volute, and wherein the nonstick coating is formed on at least a portion of the internal aerodynamic surface of the compressor housing.

12. The method of claim 10 wherein the aluminum alloy body is provided in the form of a compressor impeller having an external aerodynamic surface, and wherein the nonstick coating is formed on at least a portion of the external aerodynamic surface of the compressor impeller.

13. The method of claim 10 wherein the precursor coating composition is heat-curable, and wherein the precursor coating composition is cured by heating the aluminum alloy body to a temperature and for a duration sufficient to cure the precursor coating composition and form the nonstick coating on the aerodynamic surface of the aluminum alloy body.

14. The method of claim 13 wherein the aluminum alloy body comprises a heat-treatable aluminum alloy that includes an alloy of aluminum and at least one alloying element selected from the group consisting of silicon (Si), copper (Cu), chromium (Cr), magnesium (Mg), manganese (Mn), zirconium (Zr), and zinc (Zn).

15. The method of claim 14 further comprising:

prior to applying the precursor coating composition to at least a portion of the aerodynamic surface of the aluminum alloy body, heating the aluminum alloy body to a first temperature below a solidus temperature of the alloy for a duration sufficient to cause the at least one alloying element to enter into a homogenous solid solution with the aluminum.

16. The method of claim 15 further comprising:

after the precursor coating composition is applied to the aerodynamic surface of the aluminum alloy body, heating the aluminum alloy body to a second temperature below the first temperature for a duration sufficient to cause the at least one alloying element to precipitate from the solid solution and form a precipitate phase within an aluminum alloy matrix phase in the aluminum alloy body, wherein, heating the aluminum alloy body to the second temperature cures the precursor coating composition and transforms the precursor coating composition into the nonstick coating.

17. The method of claim 10 wherein the precursor coating composition is applied to at least a portion of the aerodynamic surface of the aluminum alloy body using a high-volume, low pressure spraying process, an electrostatic spraying process, a thermal evaporation process, or during an anodization process.

18. The method of claim 10 wherein the precursor coating composition is applied to at least a portion of the aerodynamic surface of the aluminum alloy body in the form of a solid powder or as an aqueous or non-aqueous liquid.

19. A method of manufacturing a component of a compressor assembly, the method comprising:

providing an aluminum alloy body having an aerodynamic surface, wherein the aluminum alloy body comprises an alloy of aluminum and at least one alloying element;

heating the aluminum alloy body to a first temperature below a solidus temperature of the alloy for a duration sufficient to cause the at least one alloying element to enter into a homogenous solid solution with the aluminum;

quenching the aluminum alloy body to ambient temperature to hold the at least one alloying element in the form of a supersaturated solid solution with the aluminum, wherein the supersaturated solid solution includes an aluminum matrix phase;

applying a heat-curable precursor coating composition to at least a portion of the aerodynamic surface of the aluminum alloy body; and then heating the aluminum alloy body to a second temperature below the first temperature for a duration sufficient to cause the at least one alloying element to precipitate from the aluminum alloy matrix phase and form a precipitate phase within the aluminum alloy matrix phase, wherein, heating the aluminum alloy body to the second temperature cures the heat-curable precursor coating composition and transforms the heat-curable precursor coating composition into a nonstick coating on the aerodynamic surface of the aluminum alloy body, and wherein the nonstick coating comprises a polysiloxane, zirconia, silica, alumina, titanium dioxide, polyvinylidene fluoride, a perfluoroalkoxy polymer, fluorinated ethylene-propylene, or a combination thereof.

20. The method of claim 19 wherein the first temperature comprises a temperature in a range of 450° C. to 575° C., and wherein the second temperature comprises a temperature in a range of 75° C. to 350° C.

* * * * *